March 3, 1931.  E. PRESTINARI  1,795,038
BAND CHAIN
Filed March 22, 1930
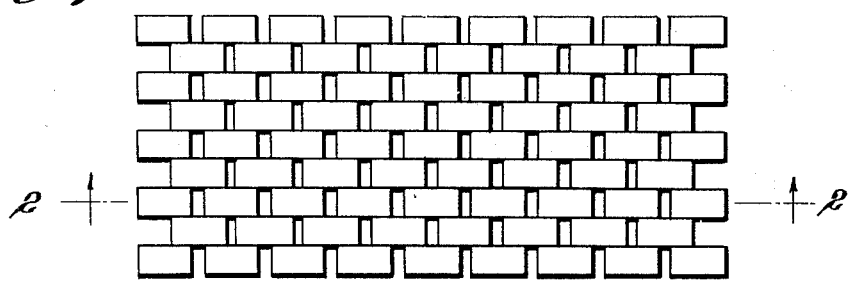
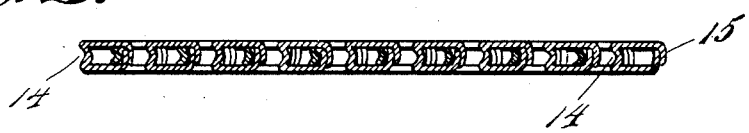
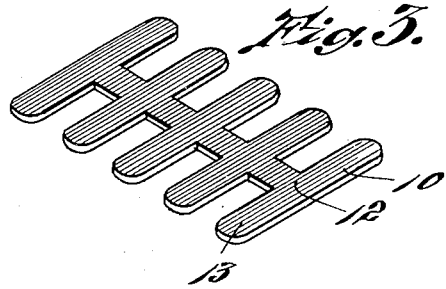 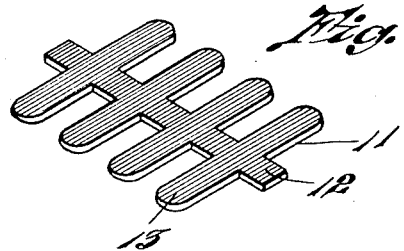
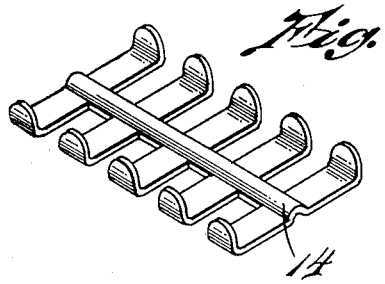 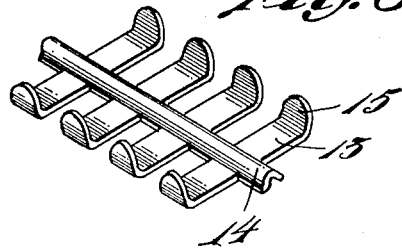
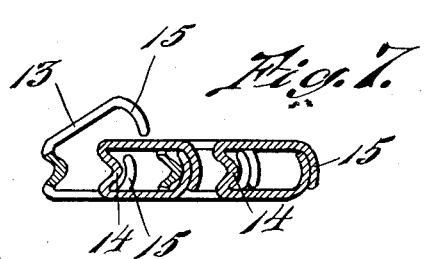
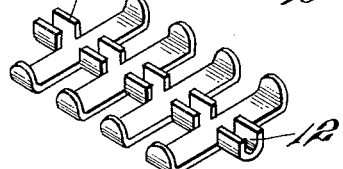
INVENTOR.
Eugen Prestinari
BY Barlow & Barlow
ATTORNEYS.

Patented Mar. 3, 1931

1,795,038

UNITED STATES PATENT OFFICE

EUGEN PRESTINARI, OF IRVINGTON, NEW JERSEY, ASSIGNOR TO GEMEX COMPANY, OF NEWARK, NEW JERSEY, A CORPORATION OF NEW JERSEY

BAND CHAIN

Application filed March 22, 1930. Serial No. 438,106.

This invention relates to a band chain more particularly adapted for bracelet use; and has for its object to provide a link chain construction having the appearance of small alternating links and cause these links to overlap each other in longitudinal relationship.

A further object of this invention is to provide a chain of sheet stock having a plurality of connected portions and deflect the stock of the connecting portions about which the connection is made to cause the links to overlap a greater distance and assume a more compact longitudinal relation one to the other.

With these and other objects and advantageous features in view, my invention consists of certain novel features of construction, as will be more fully described and particularly pointed out in the appended claims.

In the drawings:

Fig. 1 is a top plan view of the chain embodying this invention;

Fig. 2 is a section on the line 2—2 of Figure 1;

Fig. 3 is a perspective view of one of the links of the chain as blanked from sheet stock;

Fig. 4 is a perspective view of another link of the chain as blanked from sheet stock;

Figs. 5 and 6 are perspective views of the links of Figures 3 and 4 showing ribs formed in the body part of the links for more closely spacing the links in longitudinal relation;

Fig. 7 is an enlarged sectional view showing the relation of the links one with the other;

Fig. 8 is a perspective view of a modified form of link showing flanges formed on the body for more closely spacing of the links one with respect to the other.

In chain construction of thin sheet stock in which portions of one link directly engage portions of the next link to hold the links in assembled hinged relation, it is desirable that the links overlap one another a distance greater than that caused by the thickness of the stock, and to accomplish this, I have deflected portions of the transverse wall or body portion of the links in order that the arms in being wrapped about this transverse wall or body portion will cause the links to be more closely related longitudinally and have a more compact appearance when in use; and the following is a detailed description of the present embodiment of this invention showing the preferred means by which these advantageous results may be accomplished.

With reference to the drawings, 10 designates one link, and 11 the other link, each of which has a body portion 12 and arms 13. The links 10 are alternated with the links 11 in order that the arms and spaces between the arms may fit one with the other, and the body portions in longitudinal alignment. The body portions 12 of each link are each deflected, bent or offset in a direction longitudinally of the chain and which I have illustrated as in the form of a rib 14 extending transversely across the link, as illustrated in Figures 5 and 6.

The ends of each of the arms 13 are bent, as illustrated at 15 to extend over the rib 14 and over each other, as illustrated in Figure 7 to securely lock one link to the other in hinged relation; and as each of the arms is bent about the deflected portion or rib 14, the links are moved one into the other, the distance of the deflected portion or rib to cause them to further overlap and assume a more compact longitudinal relation.

In Figure 8 I have formed the spacing portion of the body by forming flanges 16 on the body 12 over which each of the arms 13 with their bent portions 15 extend in embracing the body and which will have the spacing effect of the ribs 14 above mentioned.

While I have described certain construction forms which embody the principles of my invention, it is obvious that other desired changes in arrangement may be made within the spirit and the scope of the invention as defined in the appended claims.

I claim:

1. In a chain, a series of sheet metal links, each link consisting of a transverse wall having a plurality of spaced arms projecting from one edge in a common plane at right angles to that of the transverse wall, a longitudinally extending portion on said transverse wall extending inwardly towards the ends of the arms, said arms each having an end portion directly and hingedly interlocking with a transverse wall of a similar adjacent link, and extending over said longitudinally extending portion thereof to position said links closely together.

2. In a chain, a series of sheet metal links, each link consisting of a transverse wall having a plurality of spaced arms projecting from one edge in a common plane at right angles to that of the transverse wall, a deflected portion on said transverse wall extending inwardly, said arms each having a portion directly and hingedly interlocking with a transverse wall of a similar adjacent link, and extending over said deflected portion thereof to position said links closely together.

3. In a chain, a series of sheet metal links, each link consisting of a transverse wall having a plurality of spaced arms projecting from one edge in a common plane at right angles to that of the transverse wall, a rib on said transverse wall extending inwardly to reduce the distance between it and the next transverse wall, said arms each having a portion directly and hingedly interlocking with a transverse wall of a similar adjacent link, and extending over said rib thereof to position said links in greater overlapping relation.

4. A band chain comprising a plurality of links each having a body part with two series of arms extending therefrom, each series located in a different plane, the arms of one link being formed to directly engage the body part of the next link to hingedly hold the links in assembled relation, and a longitudinally extending portion on said body part extending towards the body part of the next link to shorten the distance therebetween and over which said arms extend, whereby the body parts of the links are positioned in more compact longitudinal relation.

5. A band chain comprising a plurality of links each having a body part with two series of arms extending therefrom, each series located in a different parallel plane, the arms of one link being formed to directly engage the body part of the next link to hingedly hold the links in assembled relation, and a deflected portion on said body part extending inwardly to reduce the distance between it and the body part of the next link and over which said arms extend, whereby the body parts of the links are positioned in more compact longitudinal relation.

6. A band chain comprising a plurality of links each having a body part with two series of arms extending therefrom, each series located in a different but parallel plane, the arms of one link being formed to directly engage the body part of the next link to hingedly hold the links in assembled relation, and a rib on said body part extending inwardly to reduce the distance between it and the body part of the next link and over which said arms extend, whereby the body parts of the links are positioned in more compact longitudinal relation.

7. A band chain comprising a plurality of sheet metal links each having a body part, spaced arms extending from each body part in parallel relationship, the arms of each link extending into the spaces between the arms of adjacent links to directly and hingedly engage the body part of the adjacent links and lock the links in parallel hinged relationship, and a longitudinally extending portion on said body part extending inwardly and over which said arms extend, whereby the body parts of the links are positioned in more compact longitudinal relation.

8. A band chain comprising a plurality of sheet metal links each having a body part, spaced arms extending from each body part in parallel relationship, the arms of each link extending into the spaces between the arms of adjacent links to directly and hingedly engage the body part of the adjacent links and lock the links in parallel hinged relationship, and a deflected portion on said body part extending inwardly and over which said arms extend, whereby the body parts of the links are positioned in more compact longitudinal relation.

9. A band chain comprising a plurality of sheet metal links each having a body part, spaced arms extending from each body part in parallel relationship, the arms of each link extending into the spaces between the arms of adjacent links to directly and hingedly engage the body part of the adjacent links and lock the links in parallel hinged relationship, and a rib on said body part extending inwardly and over which said arms extend, whereby the body parts of the links are positioned in more compact longitudinal relation.

In testimony whereof I affix my signature.

EUGEN PRESTINARI.